United States Patent
Kuo

(10) Patent No.: US 8,909,018 B2
(45) Date of Patent: Dec. 9, 2014

(54) LENS ELEMENT FOR OPTICAL COMMUNICATION APPARATUS

(71) Applicant: Hon Hai Precision Industry Co., Ltd., New Taipei (TW)

(72) Inventor: Chang-Wei Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/867,108

(22) Filed: Apr. 21, 2013

(65) Prior Publication Data

US 2014/0064689 A1    Mar. 6, 2014

(30) Foreign Application Priority Data

Aug. 31, 2012   (TW) .............................. 101131856 A

(51) Int. Cl.
*G02B 6/00*  (2006.01)
*G02B 6/26*  (2006.01)

(52) U.S. Cl.
CPC ..................................... *G02B 6/262* (2013.01)
USPC ................. 385/134; 385/15; 385/31; 385/33; 385/34; 385/35

(58) Field of Classification Search
CPC .. G02B 6/4452; G02B 6/3897; G02B 6/4471; G02B 6/3825
USPC ............................ 385/15, 31, 33, 34, 35, 134
See application file for complete search history.

(56) References Cited

U.S. PATENT DOCUMENTS 8,215,814 B2 * 7/2012 Marcoux ........................ 362/555
2009/0273923 A1 * 11/2009 Veigel ............................ 362/235

* cited by examiner

*Primary Examiner* — Jennifer Doan
(74) *Attorney, Agent, or Firm* — Novak Druce Connolly Bove + Quigg LLP

(57) ABSTRACT

A lens element includes a main body. The main body includes a number of first lens portions, a number of second lens portions corresponding to the first lens portions, and a deflecting portion upwardly protruding from a surface of the main body. The deflecting portion includes a deflecting surface positioned outside the main body. The deflecting surface deflects optical signals between the first lens portions and the second lens portions.

8 Claims, 3 Drawing Sheets

LENS ELEMENT FOR OPTICAL COMMUNICATION APPARATUS

BACKGROUND

1. Technical Field

The present disclosure relates to lens elements and, particularly, to a lens element for an optical communication apparatus.

2. Description of Related Art

Optical communication apparatus generally include a number of photoelectric elements for emitting/receiving optical signals, a number of optical fibers for transmitting optical signals, and a lens element for optically coupling the photoelectric elements with the optical fibers. The photoelectric elements are typically positioned on a surface of a printed circuit board (PCB). The photoelectric elements emit/receive optical signals with a transmitting direction substantially perpendicular to the surface of the PCB, and a transmitting direction of optical signals in the optical cable is substantially parallel to the surface of the PCB. Therefore, a transmitting direction of the optical signals should be deflected for substantial 90 degrees by a deflecting structure, thus the photoelectric elements and the optical fiber can be optically coupled with each other. The deflecting structure is typically designed by defining a groove with a deflecting surface in the lens element. However, the deflecting structure will increase a difficulty of manufacturing the coupler. Further, because the deflecting surface is formed in an inner space of the lens element, a quality of the deflecting surface is difficult to be ensured.

What is needed therefore is a lens element addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
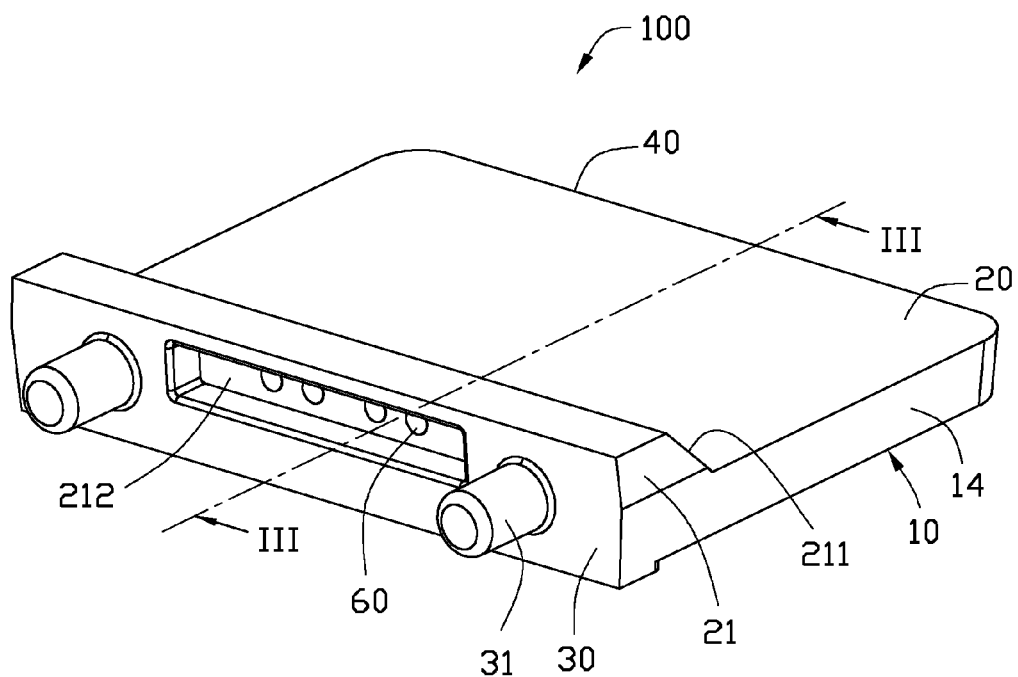
FIG. 1 is an isometric view of a lens element, according to an exemplary embodiment of the present disclosure.
Figure 2:
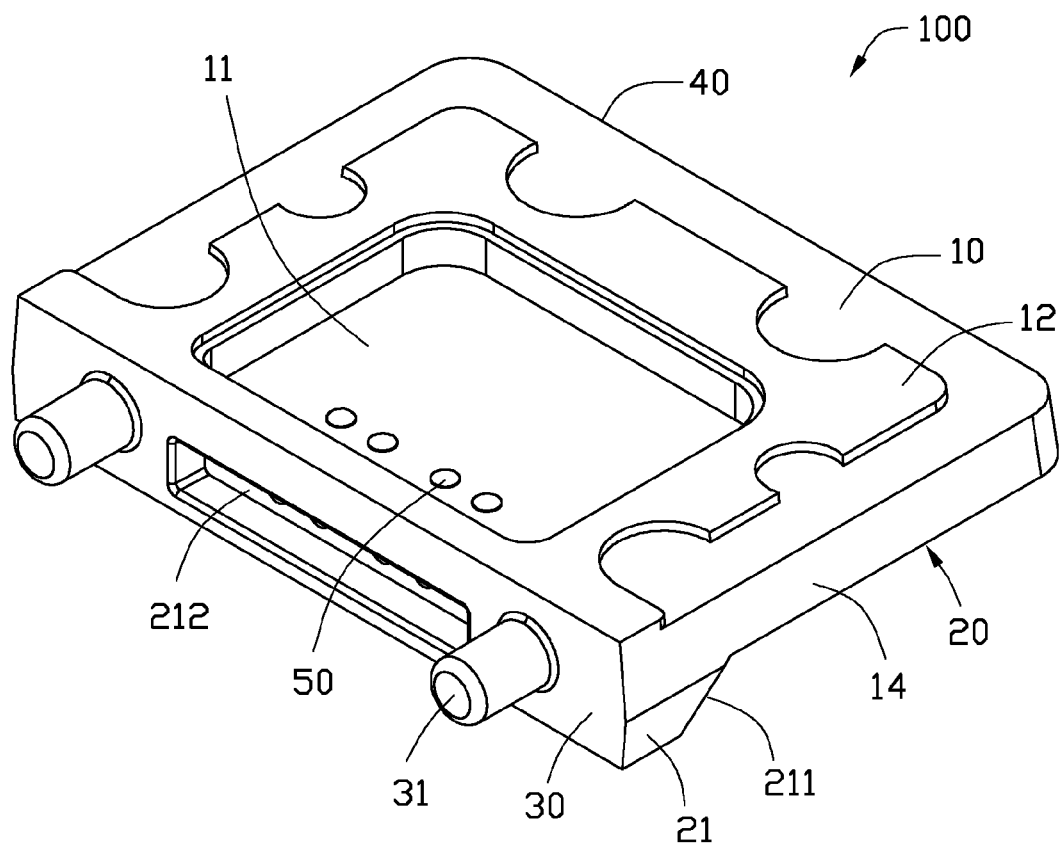
FIG. 2 is similar to FIG. 1, but shows the lens element from another angle.
Figure 3:
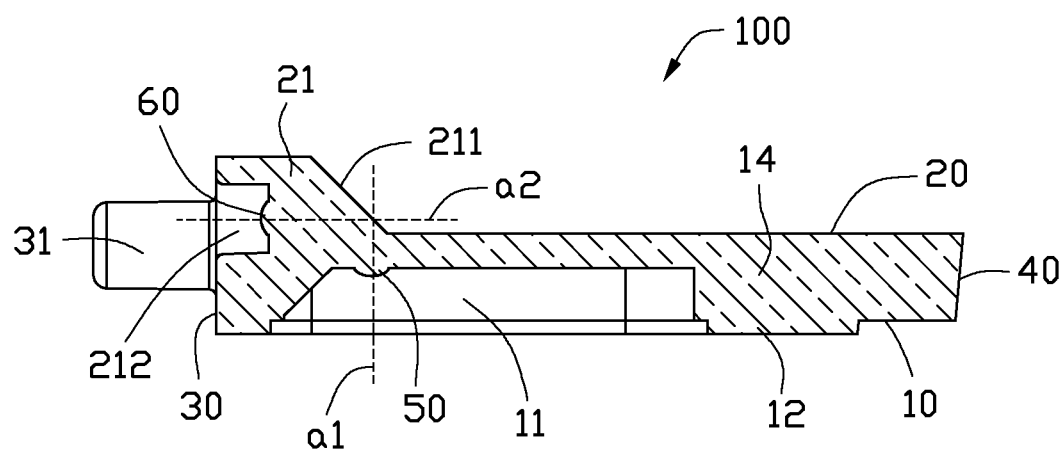
FIG. 3 is a cross-sectional of the lens element of FIG. 1, taken along line III-III.

FIGS. 1-3 show a lens element 100, according to an exemplary embodiment. The lens element 100 is used for an optical communication apparatus (not shown), for optically coupling at least one photoelectric element (not shown) with at least one optical fiber (not shown).

The lens element 100 includes a substantially rectangular-shaped main body 14. The main body 14 includes a bottom surface 10, a top surface 20 opposite to the bottom surface 10, a first end surface 30, and a second end surface 40 opposite to the first end surface 30. The bottom surface 10 is substantially parallel to the top surface 20, and the first end surface 30 is substantially parallel to the second end surface 40. The bottom surface 10 and the top surface 20 are perpendicularly connected to the first end surface 30 and the second end surface 40.

The main body 14 defines a first groove 11 in the bottom surface 10. The main body 14 includes a number of first lens portions 50 formed on a bottom surface of the first groove 11. An optical axis a1 of each first lens portion 50 is substantially perpendicular to the bottom surface 10. In this embodiment, the first lens portions 50 are convex lenses, and the first lens portions 50 are integrally formed with the main body 14. The main body 14 includes a supporting portion 12 protruding from the bottom surface 10 around the first groove 11. The supporting portion 12 supports the main body 14 on a PCB (not shown).

The main body 14 includes a deflecting portion 21 upwardly protruding from the top surface 20. The deflecting portion 21 is positioned adjacent to the first end surface 30. The deflecting portion 21 includes a deflecting surface 211 at a side away from the first end surface 30. A predetermined angle is formed between the deflecting surface 211 and the optical axis a1. The deflecting portion 21 defines a second groove 212 in a side surface opposite to the deflecting surface 211. A surface of the deflecting portion 21 with the second groove 212 defined therein is flush with the first end surface 30. The main body 14 includes a number of second lens portions 60 on a bottom surface of the second groove 212. Each second lens portion 60 is corresponding to a first lens portion 50. A predetermined angle is formed between an optical axis a2 of each second lens portion 60 and the deflecting surface 211. In this embodiment, the second lens portions 60 are convex lenses, and the second lens portions 60 are integrally formed with the main body 14.

The angle between the optical axis a1 and the deflecting surface 211 and the angle between the axis a2 and the deflecting surface 211 can be designed according to different requirements. In this embodiment, the angle between the optical axis a1 and the deflecting surface 211 and the angle between the optical axis a2 and the deflecting surface 211 are both about 45 degrees, therefore, the deflecting surface 211 deflects optical signal for substantial 90 degrees.

The lens element 100 includes two engaging posts 31 formed on the first end surface 30 of the main body 14. The engaging posts 31 are positioned at two opposite side of the second groove 212, respectively. In this embodiment, the engaging posts 31 are cylindrical-shaped. Alternatively, the engaging posts 31 can be replaced by engaging holes.

In the optical communication apparatus, the lens element 100 is positioned on a PCB (not shown), each first lens portion 50 is optically aligned with a photoelectrical element (not shown), and each second lens portion 60 is optically aligned with an optical fiber (not shown). The deflecting portion 21 deflects optical signals for a predetermined angle, thus to optically coupling the photoelectric element with the optical fiber. Because the deflecting portion 21 protrudes from the main body 14, therefore, it is easier to produce the lens element 100 with the deflecting portion 21. Furthermore, because the deflecting surface 211 is positioned out of the main body 14, a quality of the deflecting surface 211 can be easily ensured.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. A lens element, comprising:
   a main body, comprising:
      a plurality of first lens portions;
      a plurality of second lens portions corresponding to the first lens portions; and a deflecting portion upwardly protruding from a surface of the main body, the deflecting portion comprising a deflecting surface positioned outside the main body, the deflecting surface deflecting optical signals between the first lens portions and the second lens portions.

2. The lens element of claim 1, wherein the main body comprises a bottom surface, a top surface opposite to the bottom surface, a first end surface, and a second end surface opposite to the first end surface, the deflecting portion is formed on the top surface adjacent to the first end surface, and the deflecting surface is a surface of the deflecting portion at a side away from the first end surface.

3. The lens element of claim 2, wherein the bottom surface is substantially parallel to the top surface, the first end surface is substantially parallel to the second end surface, and the bottom surface and the top surface are perpendicularly connected to the first end surface and the second end surface.

4. The lens element of claim 2, wherein the main body defines a first groove in the bottom surface and a second groove in a side surface of the deflecting portion away from the deflecting surface, the first lens portions are formed on a bottom surface of the first groove, and the second lens portions are formed on bottom surface of the second groove.

5. The lens element of claim 4, wherein the side surface of the deflecting portion with the second groove defined therein is flush with the first end surface.

6. The lens element of claim 4, wherein the main body comprises a supporting portion protruding from the bottom surface around the first groove.

7. The lens element of claim 1, wherein the first lens portions and the second lens portions are integrally formed with the main body.

8. The lens element of claim 1, wherein an angle between an optical axis of each first lens portion and the deflecting surface and an angle between an optical axis of each second lens portion and the deflecting surface are both 45 degrees.

* * * * *